Jan. 14, 1969  G. GUERTIN  3,421,261
TRAP DOOR
Filed Aug. 18, 1966  Sheet 2 of 4

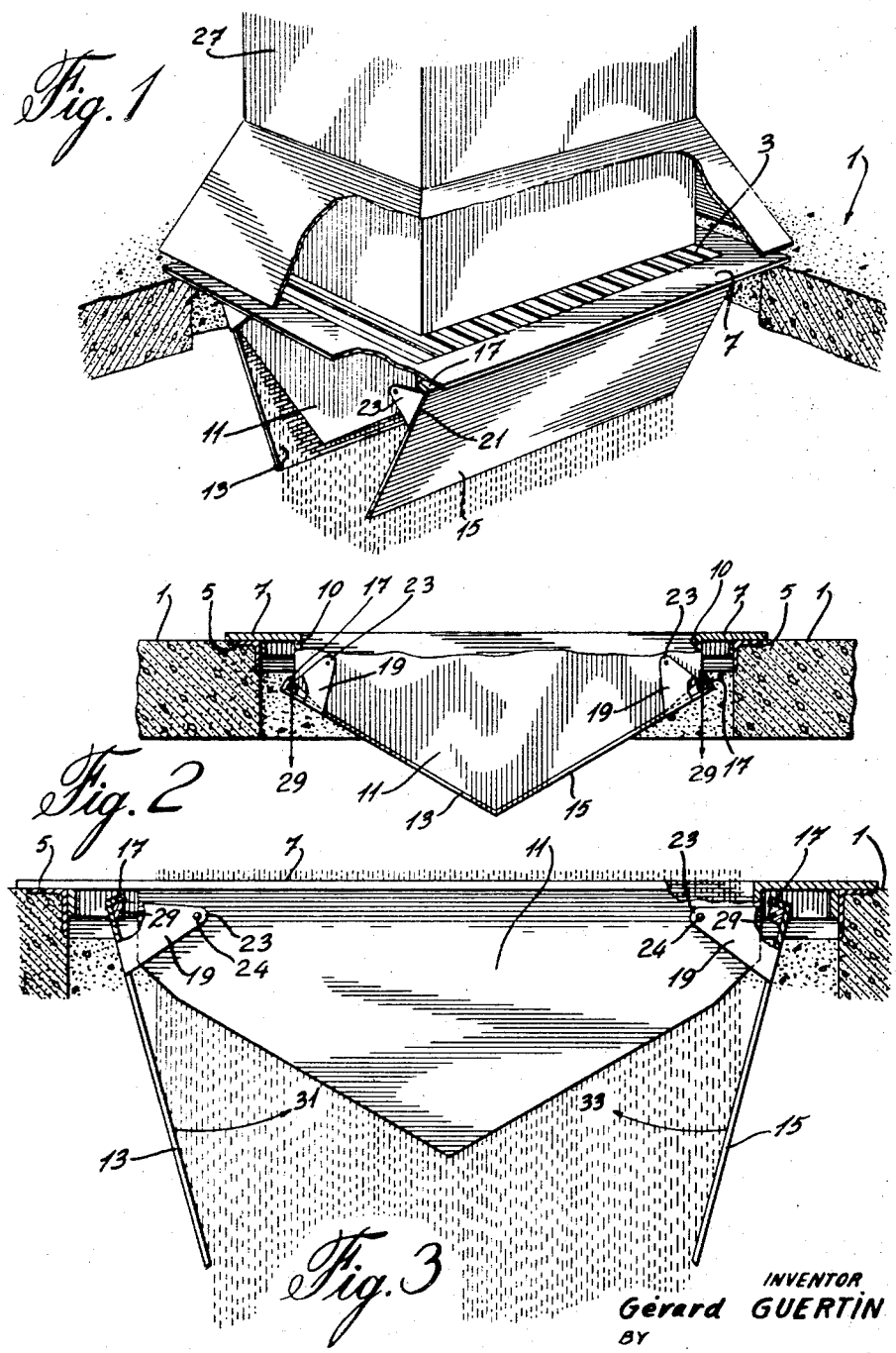

INVENTOR
Gérard GUERTIN
BY
ATTORNEY

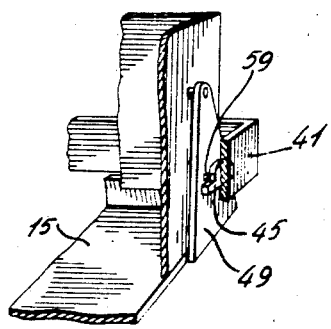
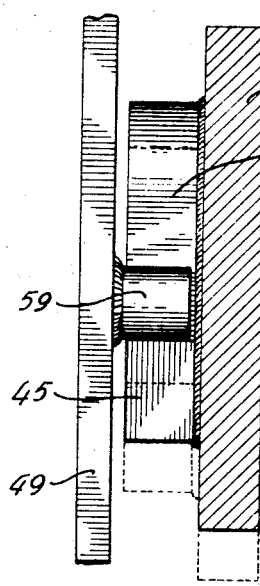
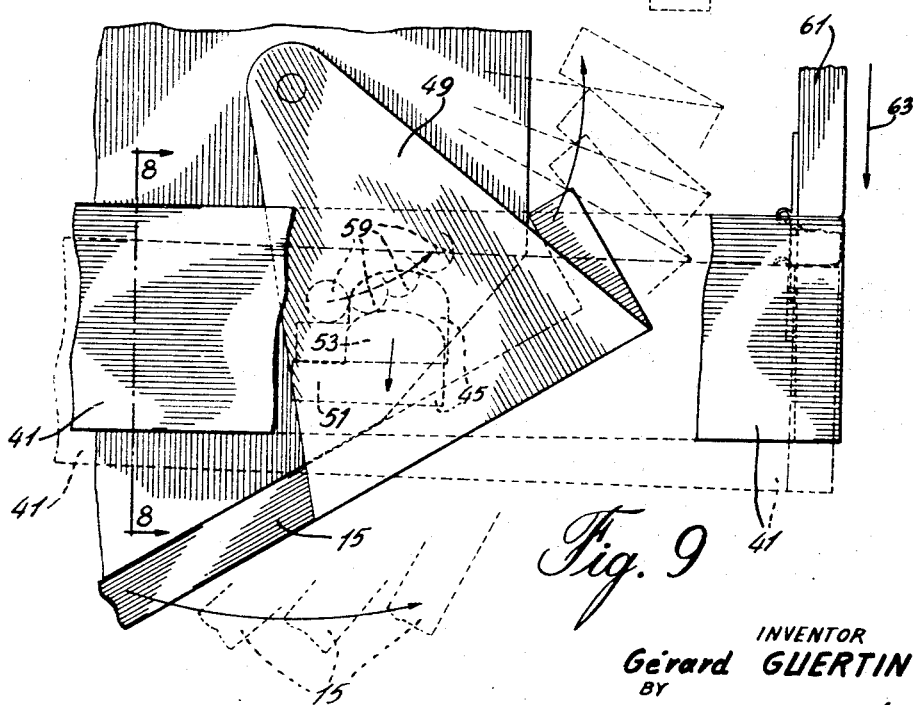

United States Patent Office 3,421,261
Patented Jan. 14, 1969

3,421,261
TRAP DOOR
Gerard Guertin, 172 Ave. de l'Elysee, Chomedey, Co.,
Laval, Quebec, Canada
Filed Aug. 18, 1966, Ser. No. 573,407
U.S. Cl. 49—371                                  11 Claims
Int. Cl. E06b 5/01; E05f 13/04; E05f 13/00

ABSTRACT OF THE DISCLOSURE

A trap door device for mounting in an opening through a floor. The door is pivoted along one edge to the door opening by means of brackets so that it is divided into a closure portion on one side of the brackets for closing the opening and actuating portion on the other side of the brackets. The actuating portion of the door is of a weight greater than the closure portion whereby to normally cause the closure portion to close the opening. The actuating portion is of a weight to cause opening of the closure portion upon material of a predetermined weight falling thereon.

---

This invention relates to a trap door. More particularly, the invention is directed to a trap door to be mounted at the top of storage silos.

The storage of granular materials such as cereals is usually carried out by bringing them at the top of silos by means of a V-shaped conveyor and to a distributing duct mounted on tracks. The grains are taken alternatively to various openings through the floor at the top of the silo to assure a good distribution within the silo.

It is known and desirable to provide trap doors in the floor openings at the top of silos, which doors are normally kept closed to prevent the spreading of dust into or away from the inside of the silos. The trap doors should preferably be automatically opened by the passage of the granular charge distributing duct thereover and act as filters to prevent the entry in the silo of nongranular foreign materials such as bottles, pieces of glass etc.

In the invention hereinafter described reference is had by way of example to cereal silos; it should be understood that the invention's usefulness is not limited to cereal silos. The term cereal being used liberally to mean any granular material which may be loaded in silos from time to time.

An object of the invention resides in the provision of a trap door device which broadly comprises a door for closing the opening to the floor, means pivotally mounting the door in said opening, said means fixed to the door at one edge thereof whereby to divide the door into a closure portion on one side of said means for closing said opening and into an actuating portion on the other side thereof, the actuating portion being of a weight greater than the closure portion whereby to normally cause said closure portion to close said opening and the actuating portion being of a weight to cause opening of the closure portion upon material of a predetermined weight falling thereon.

In an another embodiment according to the invention, the trap door device for mounting on a floor having an opening comprises a generally rectangular frame member mounted around said opening and a pair of doors mounted in the opening on the frame member by means of brackets. The brackets are pivotally mounted on the frame member to cause the doors to pivot about parallel axes in opposite directions away from each other. The device also comprises a generally rectangular strap adapted to pivot about an axis transverse of the opening and substantially midway between the parallel axes of the doors, lock pins mounted on the brackets and outwardly projecting therefrom, lock blocks mounted inwardly on the rectangular strap and adapted to cooperate with the lock pins to lock the doors, control means secured to one side of the strap to cause the strap to pivot about the transverse axis and to unlock the doors and counterweights secured to the opposite side of the strap to cause the strap to pivot about said transverse axis to thereby lock the doors.

In the drawings which illustrate embodiments of the invention,

FIGURE 1 is a perspective view of a grain cereal distributor in position over a trap door device according to the invention;

FIGURE 2 is a cross-section view of the trap door of FIGURE 1, the doors being closed;

FIGURE 3 is a cross-section view of the trap door device of FIGURE 1, the doors being opened under the weight of the falling grain cereals;

FIGURE 7 is a perspective view in elevation of the locking device;

FIGURE 8 is a top plan view of the locking device;

FIGURE 9 is a side elevation view of the locking device, various positions of the device being illustrated in dotted lines;

Figure 4:
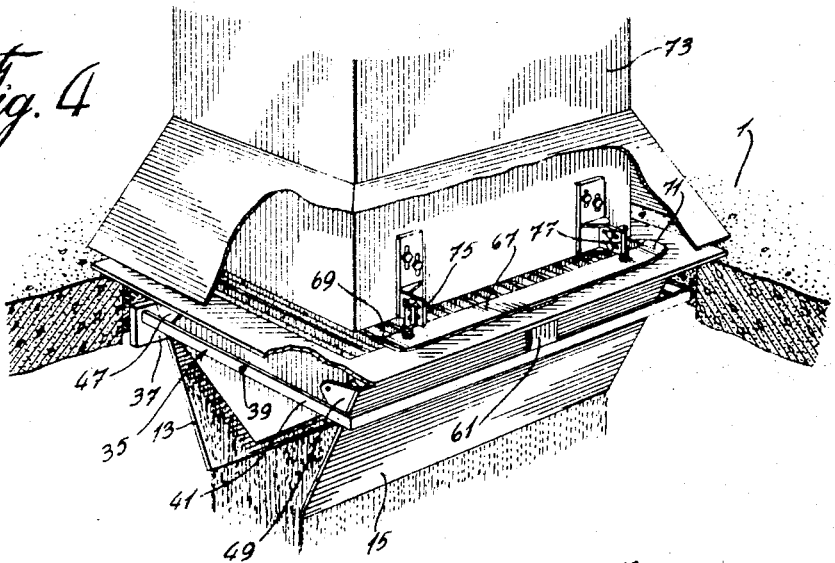
FIGURE 4 is a perspective view of a grain cereal distributor in position over another embodiment of a trap door device according to the invention.
Figure 5:
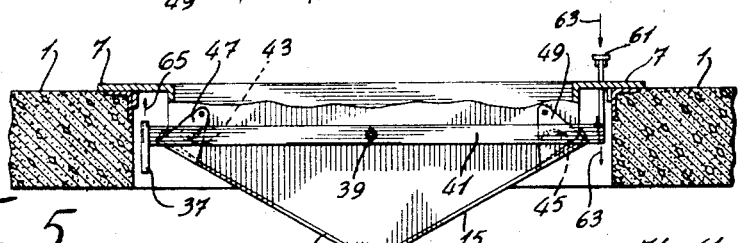
FIGURE 5 is a cross-section view of the trap door device of FIGURE 4, the doors being closed.

The device according to the invention may be better illustrated by reference to FIGURES 1, 2 and 3. Top floor 1 of a cereal silo is usually provided with a multiplicity of floor openings 3. As the top floor is usually made of concrete material, the floor opening 3 usually has a rim 5 embedded within the concrete material and fixedly mounted around said opening 3. A generally rectangular frame 7 provided with downwardly depending flanges 9 and 10 on two opposite sides thereof and with triangular depending walls 11 on the other two opposite sides thereof is mounted around the opening 3 over rim 5 through the top floor of the silo.

The trap door device further comprises a pair of doors 13 and 15 which will now be described in details. As can be seen from FIGURE 1, the doors are generally rectangular and one of the longer sides of each doors is provided with a raised edge 17 as illustrated in FIGURES 1, 2 and 3. A pair of triangular brackets 19 are secured by any known means on the side of each door corresponding to walls 11 and adjacent the raised edge 17 thereof. The brackets 19 are secured to the doors 13 and 15 in such a way that the base 21 of the triangle abuts against the side edge of each door and the apex 23 of the same triangle points upward. Each door comprises a counterweight 29 fixed to said door adjacent the raised edge 17 thereof. The doors are pivotally mounted at the apices 23 of the triangular brackets 19 to the opposite triangular depending walls 11 by means of pivot points 24. The pivot points of the doors 13 and 15 on the depending walls 11 are chosen so as to define a pair of parallel axes about which the doors may pivot in opposite direction away from each other. The weights on each side of each pivot axis are so distributed that counterweight 29 will normally force the corresponding door 13 or 15 into closing position against the adjacent edge of depending wall 11, as shown in FIGURE 2 and also such that falling cereals will force the door open.

As aforesaid, when the distributor 27 passes over opening 1 it forces opening of the doors which remain open, as illustrated in FIGURES 1 and 3, as long as the cereals keep falling through. Once the travelling duct has moved away, the counterweights 29 exert a force in the direction indicated by the arrows moving the doors to closed position as indicated by the arrows 31 and 33.

Another embodiment according to the invention will now be described with reference to FIGURES 4 to 9 inclusive. As in the case of the device of FIGURES 1, 2 and 3, the top floor 1 of the cereal silo is provided with a multiplicity of floor openings 3. Similarly, the device comprises a rim 5, a frame 7 having depending flanges 10 and triangular depending walls 11 and a pair of doors 13 and 15. The modifications over the device described hereinabove reside in the automatic control for opening and closing the trap doors.

A generally rectangular rigid strap 35 provided with a counterweight 37 along one side thereof is pivotally mounted on the two parallel triangular depending walls 11 of the frame 7 to circumscribe the doors 13 and 15.

The strap is mounted by any known means such as pivot joints 39 (FIGURES 4, 5 and 6) in order to pivot about an axis transverse of the floor opening 3. This axis is preferably midway between two edge sections of the strap and is parallel to the axes about which the doors 13 and 15 rotate. One edge section 41 of the strap 35, which is perpendicular to the above axis is provided with a pair of like lock blocks 43 and 45. These lock blocks are mounted by any known means inside the strap section 41 to be directly opposite brackets 47 and 49 and immediately adjacent thereto. The lock blocks are in parallel relationship with respect to the brackets 47 and 49.

Figure 6:
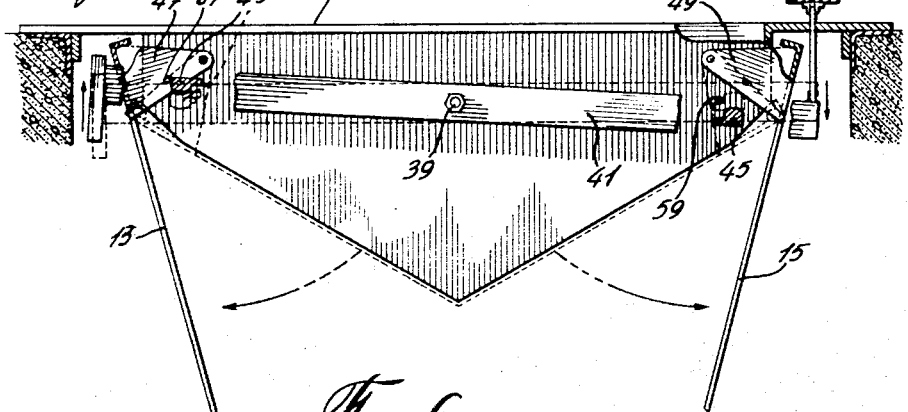
FIGURE 6 is a cross-section view of the trap door device of FIGURE 4, the doors being opened under the weight of the falling grain cereals.

The lock block 43 is inverted with respect to lock block 45, as particularly illustrated in FIGURE 6. The specific shape of the lock block is better illustrated in dotted lines in FIGURE 9. It comprises a ledge portion 51 and a rounded head portion 53. The structural functionality of these lock blocks will be described hereinbelow when discussing the automatic control of the trap door device. The brackets 47 and 49 are similar to the brackets 19 on FIGURES 1 to 3 inclusive and are similarly mounted on trap doors 13 and 15. As illustrated in FIGURE 7, each bracket comprises an outwardly projecting pin 59 to abut, in locked condition of the doors in closed position, at the junction between the ledge 51 and the rounded head 53 of the lock blocks. One side of the strap 35 opposite counterweight 37 is provided with a push pedal 61 to push down one side of the strap according to arrow 63 and to pull up the other side thereof according to arrow 65. When the strap 35 is in a horizontal position the doors 13 and 17 remain locked due to the lock pins 59 and 67 being nested in the corners defined by the ledges and rounded heads of the lock blocks 43 and 45 respectively. By pushing down the push pedal 61, the strap 35 pivots at pivot joints 39 and disengages lock pin 59 from its abutment with lock block 45. The same operation is carried out in reverse with respect to lock block 43 and lock pin 67 to cause opening of the doors. Under the weight of the doors, the latter pivot to a certain extent but are opened further under the weight of the falling cereals until they reach the general position illustrated in FIGURE 4. Once the grain cereals have stopped falling through the floor opening, the push pedal 61 is released, the doors 13 and 15 swing inwardly to occupy an intermediate position at which time the lock pins 67 and 59 move in relation to the rounded heads defined by the lock blocks up to a position where they stand close to the recesses formed, as aforesaid by the lock blocks at the intersection between the rounded heads and the ledges (see FIG. 9). The counter-balancing weight 37 on the strap is then sufficient to force engagement of the lock pins 67 and 59 into the recesses to lock the doors in the manner shown in FIGURE 5 and dotted lines in FIGURE 9, by rolling movement of the pins on the portions of the rounded heads adjacent the recesses.

A still further embodiment according to the invention resides in a completely automatic control of the opening and closing of the doors 13 and 15. This automatic control is particularly illustrated in FIGURE 4.

Figure 10:
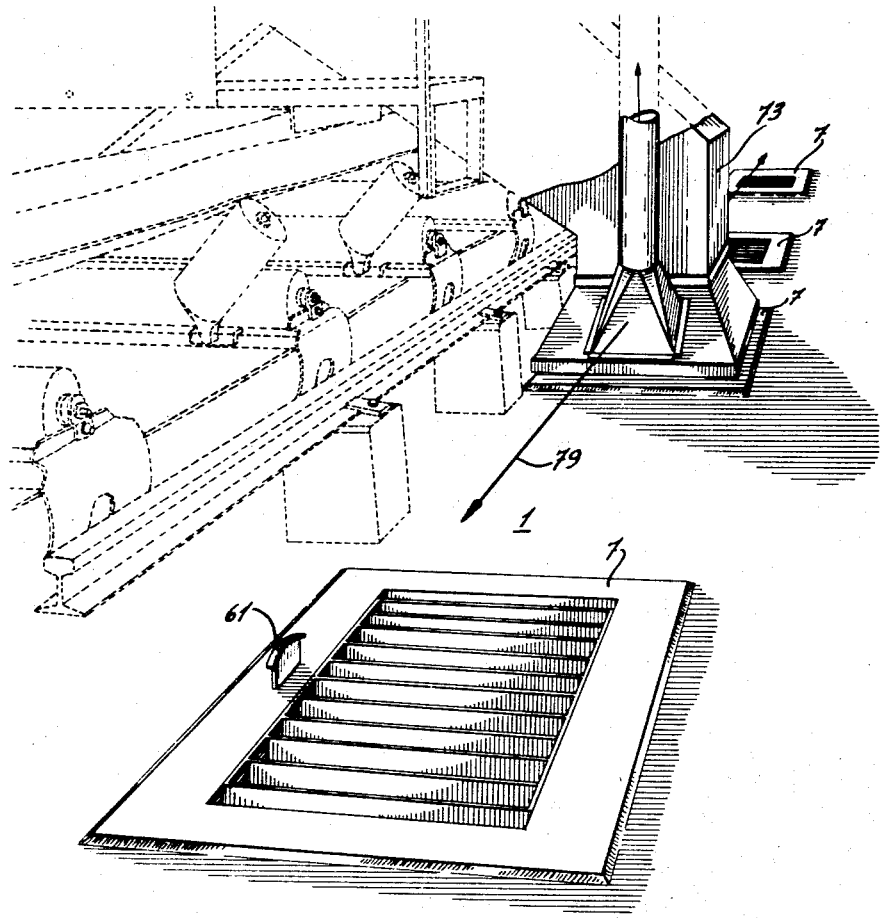
FIGURE 10 is a general perspective view of a grain cereal conveyor, a distributing duct and floor openings in a silo.

An operating shoe 67 provided with upturned ends 69 and 71 is fixedly connected to the duct 73 by means of brackets 75 and 77. Referring to FIGURE 10 it will be seen that as the duct 73 moves on the top floor of the silo in the general directions indicated by the arrow 79 and as it reaches the push pedal 61, the operating shoe 67 will press down the push pedal 61 to open the trap doors 13 and 15 during the passage of the duct 73 over the floor opening in the manner aforesaid. After the passage of the distributing duct 73 over the floor opening the push pedal 61 will be automatically released and the action of the counterweight 37 of the strap 35 will lock the doors.

It is not my intention to be limited to the details of the specific embodiments of my invention as defined herein, except as recited in the appended claims.

I claim:

1. In a trap door unit for mounting in an opening through a floor, said opening having circumscribing vertical walls, the combination comprising:
   (a) a generally quadrilateral frame defining a frame opening and to be removably mounted around said floor opening; said frame having two opposite vertical frame flanges to be spaced from said floor opening side walls and two opposite vertical frame walls;
   (b) two pairs of brackets, each mounted to depend from one of said two opposite frame walls and to pivot about two parallel axes inwardly of said frame and adjacent said vertical frame flanges;
   (c) door for closing said frame opening; each door being mounted on one of said pairs of brackets away from said pivot axes and having a closure portion directed toward the center of said frame opening, each door further having an actuating portion as an extension of said closure portion and in substantially the same plane; said actuating portions located to be retractable within the spaces between said frame flanges and said floor opening side walls when said doors are opened;
   (d) said actuating portions being of a weight greater than said closure portion whereby to normally cause said doors to close said frame opening and to cause opening of said doors upon material of a predetermined weight falling thereon.

2. In a trap door unit for mounting in an opening as defined in claim 1, the combination which further comprises:
   (d) a rigid quadrilateral strap circumscribing said frame and said doors adjacent said brackets and mounted on said frame to pivot about an axis centrally of said opening and parallel to the pivot axes of said brackets; said strap counterweighted along one of said remaining opposite sides whereby said strap normally pivots in a predetermined direction under the force of gravity;
   (e) cooperating means on said strap and on at least two of said brackets to force said doors into closed position, when opened and to lock said doors in said closed position, and
   (f) reclosing means to unlock said doors and allow them to move to open position under the force of gravity, as aforesaid.

3. A combination as claimed in claim 2 wherein each locking means is a pin on the corresponding bracket and corresponding locking block on said strap; said block defining a generally L-shaped recess for the engagement of said pin; said L-shaped recess having a generally vertical wall in closed position of the doors with an upper end curved in the direction of movement of said pin in closing motion of said door so constructed and arranged that upon pivoting of said strap under the gravity action of said counterweight, said block forces said door into closing position while said pin rolls on said curved end to become lodged in said recess.

4. In a trap door device for mounting in an opening through a floor, the combination comprising:
(a) a door for closing said opening;
(b) means pivotally mounting said door in said opening;
(c) said means fixed to said door at opposite edges thereof whereby to divide said door into a closure portion for closing said opening on one side of said means and into an actuating portion on the other side of said means; said actuating portion being an extension of said closure portion and in substantially the same plane;
(d) said actuating portion of a weight greater than said closure portion whereby to normally cause said closure portion to close said opening; said actuating portion of a weight to cause opening of said closure portion upon material of a predetermined weight falling thereon.

5. In a trap door device for mounting in an opening through a floor, the combination comprising:
(a) a pair of doors in said opening and individual means to pivot said doors in opposite directions about horizontal parallel axes to close said opening;
(b) means fixed to one of said doors at opposite edges thereof to thereby divide said door into a closure portion for closing said opening on one side of said means and into an actuating portion on the other side of said means; said actuating portion being an extension of said closure portion and in substantially the same plane;
(c) said actuating portions of a weight greater than said closure portions whereby to normally cause said closure portion to close said opening; said actuating portions of a weight to cause opening of said closure portions upon material of a predetermined weight falling thereon.

6. A combination as claimed in claim 5, wherein said opening and said doors are generally rectangular and wherein:
a frame is mounted around said opening;
said pivot means is a pair of brackets fixed to opposite edges of said doors and pivoted to said frame;
counterweights are provided on said doors to act as said actuating portions.

7. A combination as claimed in claim 6, wherein said actuating portions cause said door to close said opening only partially and means to cause complete closure and locking of said doors when partially closed and in the absence of material falling through said opening.

8. A combination as claimed in claim 7, wherein said last-named means comprises:
a generally rectangular rigid strap circumscribing said opening and doors and mounted on said frame to pivot about a horizontal axis parallel to and between said door pivot axes;
a counterweight on one side of said strap parallel to said axes;
pin on each of said brackets facing said strap; a pair of lock blocks on said strap each in facing relationship with one of said pins; said lock blocks inverted with respect to one another and each formed of a rounded head and a horizontal ledge projecting therefrom in the direction of said strap pivot axis; each head and ledge defining a locking recess therebetween, so arranged that in locked condition of said doors, said pins are nested in said locking recesses to hold said doors in locked condition and when said doors are partially closed, said pins abut said rounded head adjacent said recesses and are forced into said recesses by said strap counterweight, and
means through said frame of said opening to release said pins from said recesses.

9. A combination as claimed in claim 8, wherein said releasing means is a vertically acting pedal mounted to extend through said frame to press on the side of said strap away from said counterweighted side whereby to cause pivoting of said strap and disengagement of said pins from said recesses.

10. A combination as claimed in claim 9, for use with a duct movable over said opening to discharge material therethrough, including a shoe on the side of said duct corresponding to the pedal side of said opening, said shoe mounted on said duct at an elevation such as to cause depression of said pedal when moved over said opening.

11. A combination as claimed in claim 10, wherein said frame walls are in the form of triangles against which said doors abut in closed condition thereof.

References Cited

UNITED STATES PATENTS 2,863,181  12/1958  Josephson _____ 49—387

FOREIGN PATENTS 639,849  7/1950  Great Britain.

DAVID J. WILLIAMOWSKY, *Primary Examiner.*

J. KARL BELL, *Assistant Examiner.*

U.S. Cl. X.R.

49—104, 263, 273, 379, 387; 105—255, 280